April 14, 1931. S. B. HEATH 1,801,000
POWDERED METALLIC CHLORIDE AND METHOD OF MAKING SAME
Filed Sept. 1, 1928
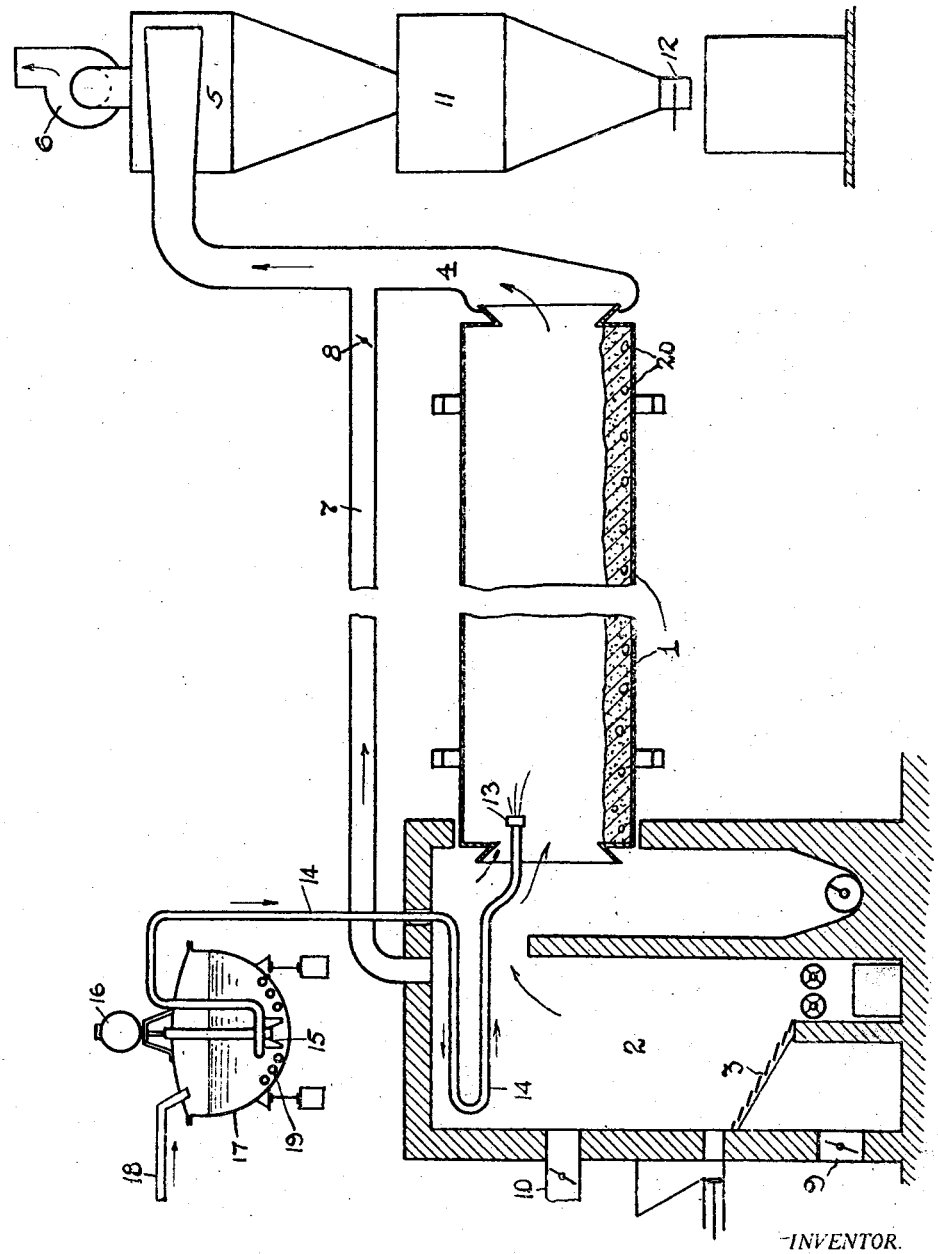
INVENTOR.
Sheldon B. Heath.
BY
Fay, Oberlin & Fay
ATTORNEYS.

Patented Apr. 14, 1931

1,801,000

UNITED STATES PATENT OFFICE

SHELDON B. HEATH, OF MIDLAND, MICHIGAN, ASSIGNOR TO THE DOW CHEMICAL COMPANY, OF MIDLAND, MICHIGAN, A CORPORATION OF MICHIGAN

POWDERED METALLIC CHLORIDE AND METHOD OF MAKING SAME

Application filed September 1, 1928. Serial No. 303,445.

Calcium chloride has been produced in quantity in comminuted form and particularly in a free-flowing, non-caking granular or flaked form, the particles having been superficially dried in accordance with U. S. Patent No. 1,527,121, issued to Paul Cottringer and William R. Collings, and/or treated in accordance with U. S. Patent No. 1,592,971, issued to Herbert H. Dow.

A product of the same general character but in the form of non-caking, free-flowing powder has desirable qualities, one being the promptness with which it will enter solution in water. Such a product is highly desirable for use when it is desired to prepare a solution, and also for incorporation in cement mixtures since the time element for entering into solution is very brief as compared with that required to dissolve the coarser flake or granular forms. The problem in hand is to produce such a product economically.

I have found that if the hydrated salt, that is, a fused hydrated salt, or a solution of such salt preferably superheated and in the form of a finely divided spray, be introduced into a dryer under properly controlled conditions, all or at least the bulk of the salt will solidify in the form of a fine powder and may be separated from the aeriform current passing through the dryer.

To the accomplishment of the foregoing and related ends, the invention, then, consists of the methods, steps and product hereinafter fully described and particularly pointed out in the claims, the annexed drawing and the following description setting forth in detail several forms of product and modes of carrying out the invention, such disclosed forms and modes illustrating, however, but several of the various ways in which the principle of the invention may be used.

In said annexed drawing:—

The single figure there appearing illustrates, in diagrammatic fashion, an apparatus for carrying out my improved process or method, and its application to production of powdered calcium chloride will be explained.

1 is a rotary cylindrical dryer shown with the center portion removed. A furnace 2 fitted with a mechanical stoker 3 is connected with one end of the dryer and from the other end a duct 4 leads to a separator 5, to which is connected an exhauster 6 adapted to produce a draft through the furnace, dryer, duct and separator. A by-pass duct 7 connects the furnace with the duct 4 and is provided with a damper 8 for controlling the volume of flow therethrough. Primary air in controlled amount may be let in below the combustion zone through the dampered opening at 9. A receiver 11 is fitted below the separator 5 having a gated outlet 12 for drawing off the separated product. A spray nozzle 13 on pipe 14 which is shown suspended in the furnace is supplied with fluid solution or fused hydrated salt by the pump 15 set in kettle 17 and driven by motor 16. The portion of the pipe 14 within the furnace acts as a superheater for the fluid under pressure therein, and its length or heat absorbing area may be adjusted to suit the requirements of the fluid being introduced and dried. A supply pipe 18 is provided to replenish the contents of the kettle 17 and steam coils 19 may be included in the kettle for control of the temperature of the contents.

In the operation of the above described apparatus for the production of powdered calcium chloride, fuel is burned in the furnace 2 and the products of combustion are drawn through the dryer 1, the duct 4, the separator 5 and then discharged from the exhauster 6. The material to be dried, in this case calcium chloride, which may be in the form of fused hydrated salt or a solution thereof, is introduced into the hot gaseous current within the rotary dryer 1 through the spray nozzle 13. The temperature of the aeriform current is adjusted to produce evaporation of water from the spray drops formed, causing solidification of the partially dehydrated salt in the form of small particles, a part or all of which will remain suspended in the aeriform current while those, if any, which are too heavy will fall into the dryer and form the burden of material therein. The suspended particles will be drawn off with the aeriform current and then separated therefrom in the separator 5 from which they will drop into receiver 11 and may be drawn off as a powder at 12 for packaging or other uses as desired. The cleaned gas stream will leave by exhauster 6. Such coarse particles as may be formed will be rolled over and over and stirred together in the dryer in the gas stream where they will become abraded and the finer particles so formed will be taken up and carried out in the gas stream. The dryer may be fitted with the usual shovels to lift up and drop the burden through the aeriform current and in cases where it is desirable to do so, I may add to the abrading action by including in the burden, pebbles, jackstones, or other elements adapted to increase the attrition or abrasion, or I may fit the dryer itself with ploughs, shelves, drags, rakes and other devices having a similar purpose. In the drawing, jackstones are indicated at 20.

Instead of introducing the feed into the dryer through a spray nozzle it may be introduced through any form of sprinkling or spraying or distributing device, or indeed, it may be introduced by simply running it in by gravity or by pumping, and furthermore either in cold, hot or superheated form. If introduced without spraying or atomizing, it will mingle with the burden and be there dried, abraded or broken up and eventually be taken up in the aeriform current and carried out in the form of fine dried particles. The dryer should under such conditions of feed preferably include adequate pulverizing or abrading elements such as pebbles or the like and means such as shovels to take up and drop the drying material through the gas current.

The method will function with a wide variety of solution concentrations and by superheating the feed under pressure to effect flash evaporation upon introduction through the spray device, or otherwise, thorough disintegration of the issuing stream may be secured and a fine division, drying and solidification of the particles may be attained. If desired, the strength of the calcium chloride solution or fluid salt supplied may be increased to any strength which can be run in as liquid. At atmospheric pressure and temperature corresponding to the boiling point at that pressure a 73 per cent. $CaCl_2$ content is about as strong as can be successfully handled without the separation of crystals which would give difficulty in an atomizer. Since, however, the evaporation of water is, in general, cheaper using furnace heat than steam or other heat in an evaporator or kettle, I prefer to use a more dilute solution of the chloride, thereby reducing the requirements for evaporation previous to the drying operation and increasing the overall economy.

In order to maintain the humidity of the gas current carrying the suspended chloride at a point at which it will not lose water, particularly to the dried salt, I prefer to by-pass a portion of the furnace gases around the dryer adding same to the gas stream carrying the salt, whereby the temperature is raised and the relative humidity lowered.

If the powdered product have a water content materially below that corresponding to $2H_2O$ crystal water it will have free-flowing, non-caking characteristics. A water content of 20 per cent is readily secured when introducing a solution of calcium chloride into the dryer.

It is obvious that a powdered form of the dried product may be obtained without the use of a rotary dryer as indicated in the drawing, it being sufficient to spray the fluid form of the salt into a current of hot gas in a suitable chamber but difficulty will be experienced ordinarily in so controlling the operation that none of the particles will reach the walls of the chamber or gas passage in a fluid or sticky form, which if they do, will cause encrustation and loss of product and eventual stoppage of the process for cleaning out. I prefer, therefore, to use a rotary cylindrical drying chamber, as indicated, providing same with jackstones, pebbles or the like, so as to dislodge and grind up such portion of the product as may either stick to the walls or fall to the bottom of the passage.

It is further obvious that dehydration or drying may be carried to various degrees, even to the anhydrous form, depending upon the water content supplied, rate of working and the temperature of the aeriform current, etc. It is, of course, necessary that the temperature of the gas current in contact with any phase shall not be sufficiently high to prevent the formation of a solid phase or to cause that solid phase to be sticky. The temperature control is readily achieved by regulating the amount of excess air entering through the dampered opening 10. The rate of working may be controlled by regulating the volume of gas flow relative to, and the weight of, material fed. The temperature of the gas stream is, of course, reduced by absorption of its sensible heat as the latent heat of evaporation of the water from the feed, and the prevention of absorption of water later by the dried particles in the duct 4 or separator 5 may be secured by controlling the amount of hot gases by-passed through 7 using the damper 8, or the duct 4 and subsequent equipment may be jacketed to introduce heat or covered to prevent loss of heat or a combination of such methods may be used.

Although I have described the process as applied to the production of a powdered form of calcium chloride, it is also applicable to the production of a similar form of other hydroscopic salts containing water of crystallization, such as magnesium chloride, etc., and if the drying be carried to such a degree that the particles contain suitably less water than that corresponding to the normal crystal water content, the product will have free-flowing, non-caking characteristics, permitting storage in package for considerable periods without disadvantageous caking.

The powdered product may in some cases be advantageously cooled before packaging since, in general, its tendency to cake increases with temperature. Such cooling may be done in a variety of ways, as by passing the powder over, adjacent to, or in contact with suitable surfaces which will absorb the heat from the powder either by contact, convection, radiation or a combination thereof, or the powder may be cooled by drawing through it or in contact therewith a current of air at a velocity below that at which the powder will go into suspension. Such a current of air, if it contain moisture, should be controlled in amount so as to avoid increasing the water content of the powder beyond the desirable amount.

Other modes of applying the principle of my invention may be employed instead of those explained, change being made as regards the composition and method herein disclosed, provided the ingredients or steps stated by any of the following claims or the equivalent of such stated ingredients or steps be employed.

I therefore particularly point out and distinctly claim as my invention:—

1. The method of preparing a powdered form of a metallic salt which contains the steps of introducing a solution thereof into a heated aeriform current, whereby the salt is solidified by evaporation in a comminuted form, a portion thereof being suspended as fine particles in said current and the remaining portion settling out as coarse particles, continuously grinding and agitating such coarse particles to produce a dust or powder thereof, floating such powder in said aeriform current and separating the suspended and floated particles therefrom.

2. The method of preparing a powdered form of a metallic salt which contains the steps of introducing a solution thereof into a current of hot gases of combustion of fuel, whereby the salt is solidified by evaporation in a comminuted form, a portion thereof being suspended as fine particles in said current and the remaining portion settling out as coarse particles, continuously grinding and agitating such coarse particles to produce a dust or powder thereof, floating such powder in said hot gaseous current and separating the suspended and floated particles therefrom.

3. The method of preparing a powdered form of a metallic salt which contains the steps of introducing a solution thereof into a current of hot gases of combustion of fuel, whereby the salt is solidified by evaporation in a comminuted form, a portion thereof bebeing suspended as fine particles in said current and the remaining portion settling out as coarse particles, continuously grinding and agitating such coarse particles to produce a dust or powder thereof, floating such powder in said hot gaseous current, separating the suspended and floated particles therefrom and regulating the humidity of the powder laden exit gases below the point whereat such powder will absorb moisture therefrom by bypassing a portion of said hot combustion gases and mixing the same directly with said exit gases.

4. The method of preparing a powdered form of a metallic salt which contains the steps of spraying a solution thereof into a heated aeriform current, whereby the salt is solidified by evaporation in a comminuted form, a portion thereof being suspended as fine particles in said current and the remaining portion settling out as coarse particles, continuously grinding and agitating such coarse particles to produce a dust or powder thereof, floating such powder in said aeriform current and separating the suspended and floated particles therefrom.

5. The method of preparing a powdered form of a metallic salt which contains the steps of spraying a solution thereof into a current of hot gases of combustion of fuel, whereby the salt is solidified by evaporation in a comminuted form, a portion thereof being suspended as fine particles in said current and the remaining portion settling out as coarse particles, continuously grinding and agitating such coarse particles to produce a dust or powder thereof, floating such powder in said hot gaseous current and separating the suspended and floated particles therefrom.

6. The method of preparing a powdered form of a metallic salt which contains the steps of spraying a solution thereof into a current of hot gases of combustion of fuel, whereby the salt is solidified by evaporation in a comminuted form, a portion thereof being suspended as fine particles in said current and the remaining portion settling out as coarse particles, continuously grinding and agitating such coarse particles to produce a dust or powder thereof, floating such powder in said hot gaseous current, separating the suspended and floated particles therefrom and regulating the humidity of the powder laden exit gases below the point whereat such powder will absorb moisture therefrom by by-passing a portion of said hot combustion gases and mixing the same directly with said exit gases.

7. The method of preparing a powdered form of a metallic salt which contains the steps of superheating a solution thereof and introducing the same into a heated aeriform current, whereby the salt is solidified by evaporation in a comminuted form, a portion thereof being suspended as fine particles in said current and the remaining portion settling out as coarse particles, continuously grinding and agitating such coarse particles to produce a dust or powder thereof, floating such powder in said aeriform current and separating the suspended and floated particles therefrom.

8. The method of preparing a powdered form of a metallic salt which contains the steps of superheating a solution thereof and spraying the same into a current of hot gases of combustion of fuel, whereby the salt is solidified by evaporation in a comminuted form, a portion thereof being suspended as fine particles in said current and the remaining portion settling out as coarse particles, continuously grinding and agitating such coarse particles to produce a dust or powder thereof, floating such powder in said hot gaseous current and separating the suspended and floated particles therefrom.

9. The method of preparing a powdered form of a metallic salt which contains the steps of superheating a solution thereof and spraying the same into a current of hot gases of combustion of fuel, whereby the salt is solidified by evaporation in a comminuted form, a portion thereof being suspended as fine particles in said current and the remaining portion settling out as coarse particles, continuously grinding and agitating such coarse particles to produce a dust or powder thereof, floating such powder in said hot gaseous current, separating the suspended and floated particles therefrom and regulating the humidity of the powder laden exit gases below the point whereat such powder will absorb moisture therefrom by by-passing a portion of said hot combustion gases and mixing the same directly with said exit gases.

10. The method of preparing a powdered form of calcium chloride which contains the steps of introducing a solution thereof into a heated aeriform current, whereby the calcium chloride is solidified by evaporation in a comminuted form, a portion thereof being suspended as fine particles in said current and the remaining portion settling out as coarse particles, continuously grinding and agitating such coarse particles to produce a dust or powder thereof, floating such powder in said aeriform current and separating the suspended and floated particles therefrom.

11. The method of preparing a powdered form of calcium chloride which contains the steps of spraying a solution thereof into a current of the hot gases of combustion of fuel, whereby the calcium chloride is solidified by evaporation in a comminuted form, a portion thereof being suspended as fine particles in said current and the remaining portion settling out as coarse particles, continuously grinding and agitating such coarse particles to produce a dust or powder thereof, floating such powder in said hot gaseous current and separating the suspended and floated particles therefrom.

12. The method of preparing a powdered form of calcium chloride which contains the steps of spraying a solution thereof into a current of hot gases of combustion of fuel, whereby the calcium chloride is solidified by evaporation in a comminuted form, a portion thereof being suspended as fine particles in said current and the remaining portion settling out as coarse particles, continuously grinding and agitating such coarse particles to produce a dust or powder thereof, floating such powder in said hot gaseous current, separating the suspended and floated particles therefrom and regulating the humidity of the powder laden exit gases below the point whereat such powder will absorb moisture therefrom by by-passing a portion of said hot combustion gases and mixing the same directly with said exit gases.

13. The method of preparing a powdered form of calcium chloride which contains the steps of superheating a solution thereof and introducing the same into a heated aeriform current, whereby the calcium chloride is solidified by evaporation in a comminuted form, a portion thereof being suspended as fine particles in said current and the remaining portion settling out as coarse particles, continuously grinding and agitating such coarse particles to produce a dust or powder thereof, floating such powder in said aeriform current and separating the suspended and floated particles therefrom.

14. The method of preparing a powdered form of calcium chloride which contains the steps of superheating a solution thereof and spraying the same into a current of the hot gases of combustion of fuel, whereby the calcium chloride is solidified by evaporation in a comminuted form, a portion thereof being suspended as fine particles in said current and the remaining portion settling out as coarse particles, continuously grinding and agitating such coarse particles to produce a dust or powder thereof, floating such powder in said hot gaseous current and separating the suspended and floated particles therefrom.

15. The method of preparing a powdered form of calcium chloride which contains the steps of superheating a solution thereof and spraying the same into a current of hot gases of combustion of fuel, whereby the calcium chloride is solidified by evaporation in a comminuted form, a portion thereof being suspended as fine particles in said current and the remaining portion settling out as coarse particles, continuously grinding and agitating such coarse particles to produce a dust or powder thereof, floating such powder in said hot gaseous current, separating the suspended and floated particles therefrom and regulating the humidity of the powder laden exit gases below the point whereat such powder will absorb moisture therefrom by by-passing a portion of said hot combustion gases and mixing the same directly with said exit gases.

Signed by me this 28th day of August, 1928.

SHELDON B. HEATH.